(12) United States Patent
Nie

(10) Patent No.: US 6,320,622 B1
(45) Date of Patent: Nov. 20, 2001

(54) DE-EMPHASIS FILTER WITH INTEGRATED DETERMINATION OF ACHROMATIC VALUES

(75) Inventor: Xiaoning Nie, Vaterstetten (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/537,883

(22) Filed: Mar. 29, 2000

Related U.S. Application Data

(63) Continuation of application No. PCT/DE98/02627, filed on Sep. 7, 1998.

(51) Int. Cl.⁷ .............................. H04N 11/18; H04N 5/21
(52) U.S. Cl. ..................... 348/491; 348/607; 348/613; 348/619; 382/265
(58) Field of Search ..................................... 348/607, 613, 348/618, 619, 638, 639, 711, 712, 713, 503, 504, 505, 506, 507, 508, 509, 490, 491; 382/265; H04N 11/18, 5/21, 5/217

(56) References Cited

U.S. PATENT DOCUMENTS

| | | | |
|---|---|---|---|
| 3,863,264 | * 1/1975 | Nelson et al. | 348/639 |
| 4,135,201 | * 1/1979 | Dickie et al. | 348/713 |
| 4,499,427 | 2/1985 | Demmer et al. | |
| 4,571,613 | * 2/1986 | Fukuda et al. | 348/622 |
| 4,646,153 | * 2/1987 | Fukuda et al. | 348/619 |

FOREIGN PATENT DOCUMENTS

| | | |
|---|---|---|
| 281 073 A1 | 7/1990 | (DE) . |
| 294 152 A5 | 9/1991 | (DE) . |
| 0 335 371 A2 | 10/1989 | (EP) . |

OTHER PUBLICATIONS

"Digitale PAL–SECAM–Videosignalverarbeitung" (Digital PAL–SECAM–video signal processing), Electronics, vol. 12, Berlin 1988, pp. 751–757.

Patent Abstracts of Japan No. 59–128890 (Teruo), dated Jul. 25, 1984.

* cited by examiner

*Primary Examiner*—Michael Lee
(74) *Attorney, Agent, or Firm*—Herbert L. Lerner; Laurence A. Greenberg; Werner H. Stemer

(57) ABSTRACT

A digital de-emphasis filter for a SECAM decoder for converting a sequence of input image data into filtered image data includes at least one recursion register for storing an auxiliary value that is obtained using an input image data value. An arithmetic circuit uses the auxiliary value and a newly input image data value to generate a new auxiliary value, which replaces the contents of the recursion register, and a filtered image data value. To determine the achromatic value in addition to performing de-emphasis filtering, the filter is provided with a device for storing and outputting a value representative of an estimated value of the achromatic value of the SECAM signal, and a first switch for applying and registering the output estimated value into the recursion register at the beginning of each burst gate period of the SECAM signal. The arithmetic circuit uses the registered estimated value and at least one value of the burst signal to output an estimated value that is updated using this burst signal value.

8 Claims, 1 Drawing Sheet

DE-EMPHASIS FILTER WITH INTEGRATED DETERMINATION OF ACHROMATIC VALUES

CROSS-REFERENCE TO RELATED APPLICATION

This is a continuation of copending International Application PCT/DE98/02627, filed Sep. 7, 1998, which designated the United States.

BACKGROUND OF THE INVENTION

Field of the Invention

The invention relates, in general, to a de-emphasis filter for SECAM-coded picture signals. Such filters are used in SECAM decoders for television or video equipment.

The SECAM Standard provides for the color information of an image to be transmitted with half as large a spatial resolution as the brightness information. In effect, color information is transmitted only with each second picture line. Since a complete item of color information includes two different types of color information in addition to the brightness, only one of the two items of information is modulated onto the signal of the relevant line, the other being transmitted with the line following thereupon. In order to be able to distinguish the two different items of color information at the receiver, two different carrier frequencies $f_r$ and $f_b$ are used for the two types of information. The lines thus modulated are denoted correspondingly as $D_r$ lines and $D_b$ lines, respectively.

The incoming color information signals are mixed in the receiver with a frequency of $f_0=4.286$ MHz. This yields base frequency signals with a constant offset that corresponds in each case to the difference between the respective color carrier frequency and the mixed frequency:

$f_r-f_0$ and $f_b-f_0$, respectively. These frequencies must be very constant in order to avoid errors in the color rendition. The transmitter therefore transmits, in the burst gate period of the signal, identification pulses that are intended to permit the detection of a line as a $D_r$ line or $D_b$ line and to permit the adjustment of the mixed frequency $f_0$.

A special circuit must be provided in each SECAM decoder for the purpose of evaluating these pulses and forming a mean value over a plurality of rows (the achromatic value).

SUMMARY OF THE INVENTION

It is accordingly an object of the invention to provide a de-emphasis filter for a SECAM decoder which overcomes the hereinafore-mentioned disadvantages of the heretofore-known devices of this general type in such a way that a special circuit for evaluating the identification pulses transmitted in the burst gate period need not be provided for the SECAM decoder.

The invention is based on the finding that this special circuit is always active only during a fraction of the picture signal periods, specifically during the blanking interval, in which the burst signal is transmitted. A further obligatory component of each SECAM decoder is a de-emphasis filter. The de-emphasis filter serves the purpose of once again damping radio-frequency components of the picture signal that are transmitted by the transmitter with a gain (with pre-emphasis) relative to the low frequency components in order to achieve a linear response characteristic with a constant signal-to-noise ratio. This de-emphasis filter is active only during the transmission of the picture line signal.

With the foregoing and other objects in view there is provided, in accordance with the invention, a digital de-emphasis filter that can be become active during the blanking interval for the purpose of determining the achromatic value.

The digital de-emphasis filter includes a recursion register for storing an auxiliary value obtained from an input image data value, and an arithmetic circuit configured to use the auxiliary value and a new image data value to generate a new auxiliary value and a filtered image data value. A device is provided for storing and outputting a value representative of an estimated value of an achromatic value of a SECAM signal. A first switch is provided for applying the value output by the device into the recursion register to obtain a registered value at the beginning of each burst gate period of the SECAM signal. The arithmetic circuit is configured to use the registered value and at least one value of the burst signal of the SECAM signal to output an estimated value that is updated using the value of the burst signal.

When the filter is being operated as a de-emphasis filter, the recursion register receives and stores an auxiliary value that can be an intermediate value that occurs during the determination of the output value of the filter, or can be the output value itself, and that subsequently features in the processing of a subsequent line signal value input into the filter. The strength of this influence or of the recursivity is determined by components of the arithmetic circuit such as, for example, multipliers. At the start of the burst gate period, the contents of the recursion register are replaced by an estimated value with the aid of a device for outputting a signal representative of an estimated value of the achromatic value and with the aid of a first switch. During the burst gate period, the filter processes at least one value of the burst signal with the aid of the estimated value, in order to obtain an improved estimated value. This can be performed, in particular, by the filter generating and outputting a mean value of the estimated value and of the burst signal value.

In accordance with an added feature of the invention, there is provided a device for outputting an estimated value that includes a register in which a value representative of an achromatic value measured in the course of an earlier burst gate period is stored. It is particularly advantageous for this purpose for the filter to include a second switch which, at the end of each burst gate period, applies the output value of the recursion register to an input of the device for outputting an estimated value for the purpose of storing the output value therein.

In accordance with an additional feature of the invention, the device for outputting an estimated value expediently includes two registers in order to be able to handle two different estimated values, one for $D_r$ lines and the other for $D_b$ lines. A particularly simple management of the registers results when the latter are not assigned to one type of line, but are connected in series so that each register alternately stores $D_b$ estimated values and $D_r$ estimated values.

In accordance with another feature of the invention, there is provided at least one multiplier with a variable multiplication factor. Differences in the processing of line signal data and burst signal data can be accomplished, for example, with the aid of such a multiplier with a variable multiplication factor. Alternatively, or in combination therewith, a different response of the filter, in the case of an unchanged transfer function, can be simulated by virtue of the fact that the filter operates with a different clock-pulse rate during the picture line signal than during the burst signal.

Other features which are considered as characteristic for the invention are set forth in the appended claims.

Although the invention is illustrated and described herein as embodied in a de-emphasis filter with integrated determination of achromatic values, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
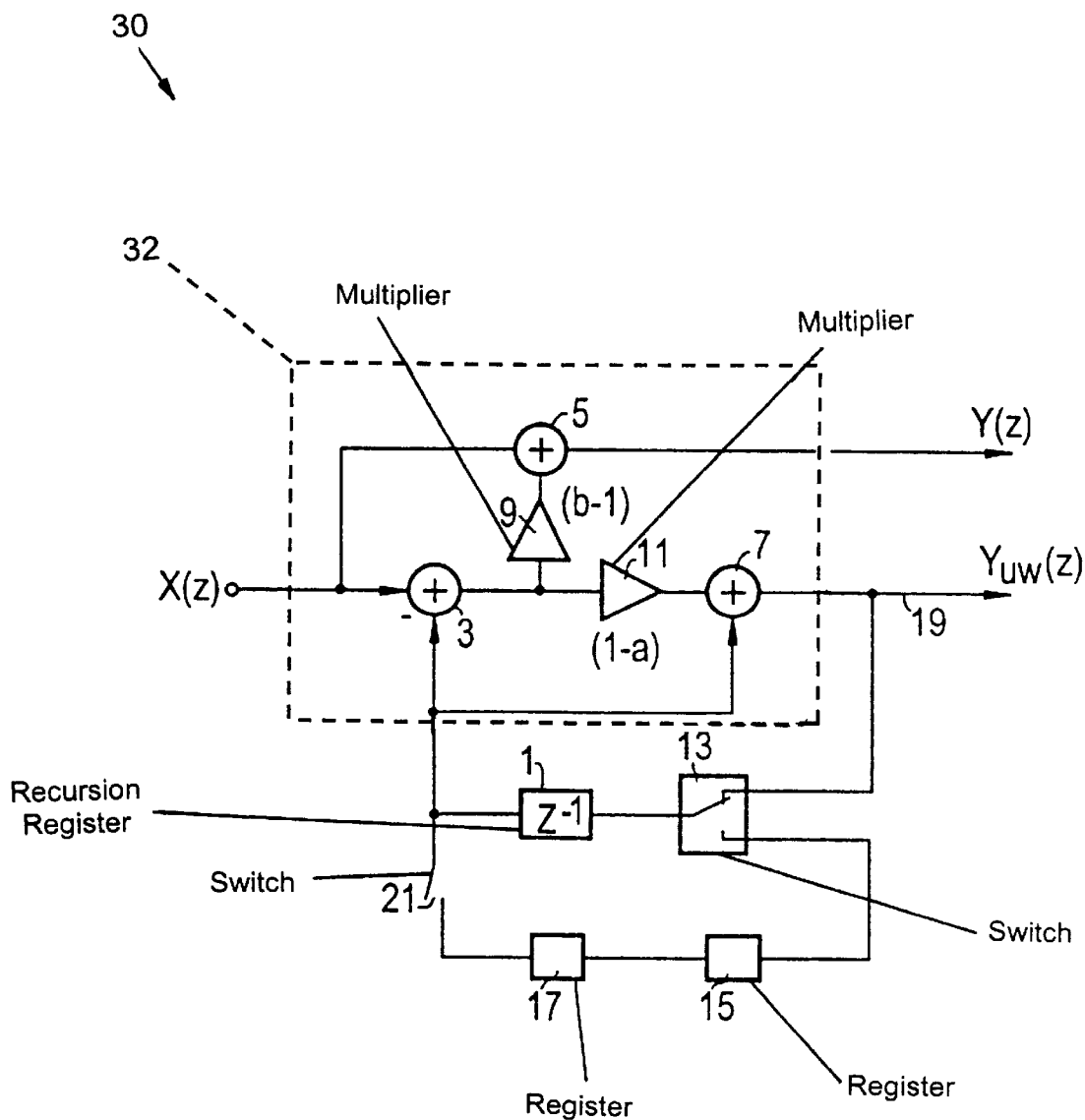
FIG. 1 is a schematic block diagram of a de-emphasis filter for determining achromatic values.

The transfer function of a de-emphasis filter can be written in the general form of:

$$H(z) = \frac{b + cz^{-1}}{1 - az^{-1}}, \quad (1)$$

where $|a|<1$. If it is required, in addition, that the DC gain is 1, it must hold that:

$$H(1) = \frac{b + c}{1 - a}. \quad (2)$$

Solving (2) for c, and substituting the result c=1−a−b in (1) yields $$H(z) = \frac{b + (1 - a - b)z^{-1}}{1 - az^{-1}} = 1 + \frac{(b - 1)(1 - z^{-1})}{1 - az^{-1}}. \quad (3)$$

Referring now to FIG. 1, the sole figure of the drawing, there is seen a recursion filter or register 1, and an arithmetic circuit 32 with adders 3, 5, 7 and multipliers 9, 11 that are configured to realize the transfer function. First inputs of the adders 3, 5 are directly connected to the input of the de-emphasis filter 30. Multipliers 9, 11 with multiplication factors of (b−1) and (1−a), respectively, are connected to the output of the adder 3. The output of the multiplier 11 is connected via the adder 7 to the input of the recursion register 1. The output of the recursion register 1 is connected to the respective second inputs of the adders 3 and 7, and outputs to them the auxiliary data value output by the adder 7 during the respective preceding clock period of the filter 30. The second input of the adder 5 is connected to the multiplier 9 and its output forms the output for the picture line values de-emphasized by the de-emphasis filter 30.

A first switch 13 is configured between the adder 7 and the input of the recursion register 1, and connects the two to one another in a first position as long as the picture line signal continues.

Between the end of a picture line signal and the beginning of a first signal, the first switch 13 is brought once by a control circuit (not represented) into a second position in which it connects the recursion register 1 to a first register 15 in which an estimated value of the achromatic value is stored for the next line, and this achromatic value is registered in the recursion register 1. If necessary, the control circuit also changes the multiplication factor (1−a) of the multiplier 11.

The auxiliary value stored in the recursion register 1 and derived from the last image data value of the preceding picture line is overwritten in the process and lost. However, this is not damaging to the de-emphasis filtering. Because of the large spacing, there is scarcely any correlation between the image contents at the last points of a picture line and the first points of the following line. Thus the value for the de-emphasis filtering of the start of the following picture line is worthless in any case.

The circuit carries out at least one operating cycle during the burst gate period. The adder 3 forms the difference between the input burst signal value y and the contents $Y_{uw}$ (−1) of the recursion register 1. After multiplication by the factor (1−a) in the multiplier 11, the register contents $Y_{uw}$ (−1) are added on again in the adder 7. The output value $Y_{uw}$ (0)=(1−a)y+a$Y_{uw}$ (−1) thus obtained is registered in the recursion register 1 as the current estimated value of the achromatic value via the first switch 13, which has meanwhile returned to its first position. The process is repeated in further operating cycles. For values of (a) near 1, the achromatic value for the image data following the burst gate period is thus obtained as a sliding mean value in which previous picture lines are included which have an exponentially decreasing weighting. The number of picture lines over which the averaging effectively extends can be fixed by appropriately selecting the (a) value and appropriately fixing the number of values of the burst signal to be processed in each burst gate period, or both. The mean value obtained is output via a second output 19 of the de-emphasis filter 30, which is connected to the output of the adder 7.

At the end of the burst gate period, the control circuit closes a second switch 21, which connects the output of the recursion register 1 to a second register 17, in order to store the current estimated value $Y_{uw}$ (0) therein. The deviating achromatic value, corresponding to the preceding picture line, is transferred from the second register 17 into the first register 15, which are connected in series, at the latest at that instant. A change that may have occurred in the multiplication factor (1−a) of the multiplier 11 is canceled in this phase. Subsequently, the second switch 21 is reopened, with the result that the contents of the second register 17 remain unchanged during the de-emphasis filtering of the picture line signal following the burst gate period.

In the course of the next burst gate period, the value thus obtained is transferred from the second register 17 into the first register 15, in order to be registered again in the recursion register 1 at the beginning of the period after this next burst gate period. Both achromatic values are thus respectively alternately stored in one of the two registers 13, 15 and are alternately processed in one and the same filter circuit, without interfering with one another.

The above described de-emphasis filter 30 circuit permits variable de-emphasis filtering in which no division is necessary for its normalization. Since the separately designed achromatic value accumulator previously required is eliminated, it is possible to save approximately one third of substrate area in comparison to the conventional integrated implementation.

The present invention comprises a multiplicity of modifications within the scope of the claims. Thus, for example, it is possible to connect the registers 15, 17 not in series, but in parallel. The control circuit would then control the registers 15, 17 such that, alternating in each case from one picture line to the next, at the beginning of the burst gate period, one of the registers 15, 17 transfers the stored value into the recursion register 1, and at the end of this period the updated value contained in the recursion register 1 is used for overwriting. Thus, each register 15, 17 is permanently assigned a type of line.

For this purpose, the first switch 13 can have three positions: the first position, described above and a second and a third position, in which it connects the input of the recursion register 1 to the output of the first register 15 and the second register 17, respectively.

I claim:

1. A digital de-emphasis filter for a SECAM decoder and for converting a sequence of input image data into filtered image data, the filter comprising:
   a recursion register for storing an auxiliary value obtained from an input image data value;
   an arithmetic circuit configured to use the auxiliary value and a new image data value to generate a new auxiliary value and a filtered image data value;
   a device for storing and outputting a value representative of an estimated value of an achromatic value of a SECAM signal; and
   a first switch for applying the value output by said device into said recursion register to obtain a registered value at the beginning of each burst gate period of the SECAM signal;
   said arithmetic circuit configured to use the registered value and at least one value of the burst signal of the SECAM signal to output an estimated value that is updated using the value of the burst signal.

2. The filter according to claim 1, wherein said recursion register, said arithmetic circuit, said device, and said first switch are configured to generate and output a weighted mean value of the estimated value and the value of the burst signal.

3. The filter according to claim 1, wherein said device includes a register for storing a signal representative of an achromatic value measured during an earlier burst gate period of the SECAM signal.

4. The filter according to claim 3, comprising a second switch configured to apply the registered value output by said recursion register to said device for storing the registered value therein.

5. The filter according to claim 3, wherein said register defines a first register and said device includes second register, said first register and said second register for storing an estimated value for a $D_r$ line and a $D_b$ line, respectively.

6. The filter according to claim 5, wherein said first register and said second register are connected in series.

7. The filter according to claim 1, comprising a multiplier having a multiplication factor that assumes a value during the burst gate period that is different than a value during a picture line transmission.

8. The filter according to claim 1, wherein said recursion register, said arithmetic circuit, said device, and said first switch operate with a clock-pulse rate during the burst gate period that is different than a clock-pulse rate during a picture line transmission.

\* \* \* \* \*